Figure 1:
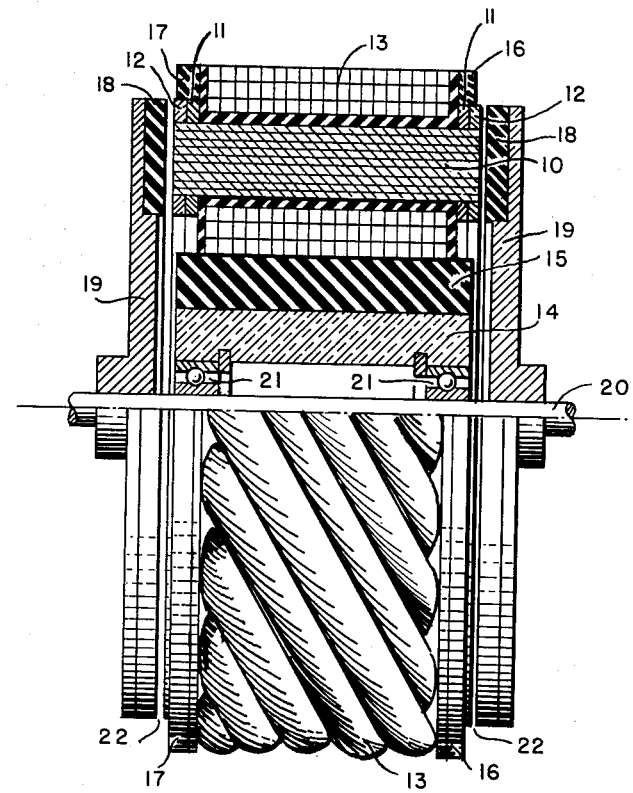

Feb. 27, 1962 H. C. ROTERS 3,023,330
AXIAL AIR-GAP DYNAMOELECTRIC MACHINE
Filed April 8, 1960

2 Sheets-Sheet 2

United States Patent Office 3,023,330
Patented Feb. 27, 1962

3,023,330
AXIAL AIR-GAP DYNAMOELECTRIC MACHINE
Herbert C. Roters, Kew Gardens, N.Y., assignor to Casner Patents, Inc., a corporation of New York
Filed Apr. 8, 1960, Ser. No. 20,955
1 Claim. (Cl. 310—162)

This invention relates to axial air-gap dynamoelectric machines and, while it is of general application, it is particularly suitable for embodiment in hysteresis synchronous motors and will be specifically described in such an environment.

In certain applications of electric motors, the space available for the motor is not of a form suitable for mounting a conventional motor having a radial air gap, that is, one in which the rotor rotates within the stator and is substantially axially coextensive. To meet this problem, there have heretofore been proposed certain axial air-gap motors, that is, motors of the type in which the rotor extends axially beyond the stator and is separated slightly axially to form an air gap. One such motor is described in Electrical Engineering of July 1947, pages 670–671.

However, motors of the axial air-gap type heretofore proposed have involved complex, costly, and difficult constructions and have yielded relatively low power per unit weight. One problem has been the fabrication of the laminated magnetic core structure required in such a motor. Furthermore, motors of such type heretofore proposed have tended to be magnetically unbalanced axially, requiring some form of thrust bearing.

It is an object of the present invention, therefore, to provide a new and improved axial air-gap dynamoelectric machine which obviates one or more of the above-mentioned disadvantages of prior dynamoelectric machines of this type.

It is another object of the invention to provide a new and improved axial air-gap dynamoelectric machine which is characterized by a simple, inexpensive construction, a relatively high power rating per unit weight, and one that is magnetically balanced axially.

In accordance with the invention, a yokeless dynamoelectric machine of the axial air-gap type comprises an armature structure including a circular array of axially extending magnetic members and a winding system disposed on the magnetic members, and a pair of annular members disposed at either end of such array and together completing the magnetic circuits of the members of the array, such annular members and the armature structure being relatively rotatable. By the term "yokeless dynamoelectric machine," as used herein and in the appended claim, is meant a structure in which the return magnetic paths for the magnetic cores or teeth on which the armature winding is disposed comprises the associated relatively rotating member, usually a rotor, thereby eliminating the conventional magnetic yoke which serves solely as the magnetic return paths for the magnetic core elements. By the term "magnetic member," as used herein and in the appended claim, is meant a member either of high magnetic permeability, such as a conventional soft steel member with or without an associated winding, or a member having high magnetic remanence, that is, a permanent magnetic member.

For a better understanding of the present invention, together with other and further objects thereof, reference is had to the following description taken in connection with the accompanying drawings, while its scope will be pointed out in the appended claim.

Figure 2:
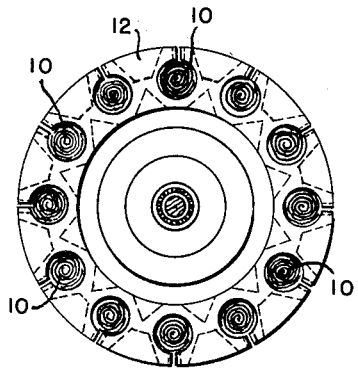
Figure 3:
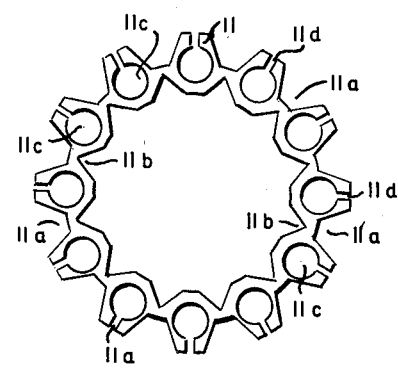
Figure 4:
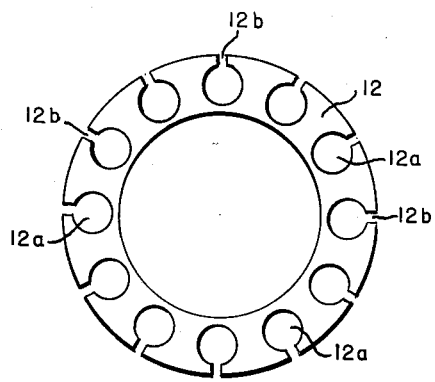
Figure 5:
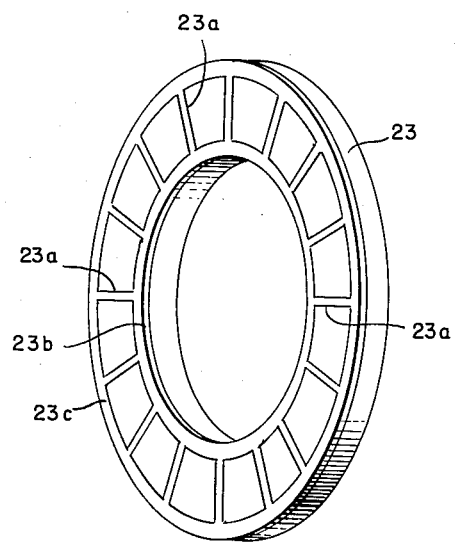

Referring now to the drawings:
FIG. 1 is a view in elevation, partly in section, of an axial air-gap hysteresis synchronous motor embodying the invention;

FIG. 2 is an end view of the stator structure of the motor of FIG. 1;
FIGS. 3 and 4 are detail views of the magnetic end rings of the stator structure of FIG. 1; while
FIG. 5 is a perspective view of an induction rotor element suitable for use with the stator structure of FIG. 1.

Referring now more particularly to FIG. 1 of the drawings, there is represented a yokeless dynamoelectric machine of the axial air-gap type embodying the present invention. This machine comprises a unitary armature structure including a circular array of axially extending magnetic core members or teeth 10 preferably constructed in the form of a tightly coiled strip of high-permeability sheet metal, such as silicon-steel strip. The armature structure also includes a pair of annular magnetic members 11, 11 engaging opposite ends of the magnetic members 10 and serving to secure them in position and also serving as flux spreading pole faces therefor. One of the magnetic members 11 is shown in detail in FIG. 3, from which it is seen that it is formed with a series of outer recesses 11a and a series of inner recesses 11b between each pair of adjacent core members 10 which are effective greatly to reduce the cross-sectional area of the member 11 between the members 10 and thus minimize the shunting of their magnetic flux from the rotor members described hereinafter. The member 11 also is formed with a series of circular apertures 11c for tightly engaging and holding in place the core members 10. Preferably a series of radial slots 11d extend from the several apertures 11c to minimize circulating eddy currents.

The armature structure also includes a pair of annular magnetic members 12, one of which is shown in detail in FIG. 4, which immediately overlie the magnetic members 11 at either end of the array of core elements 10. The members 12 are formed from a relatively thin sheet of high-permeability material and serve to bridge the slots or spaces between the several core elements 12. Each of the rings 12 is formed with a series of circular apertures 12a for engaging the core members 10 together with slots 12b extending radially outwardly from the apertures 12a to minimize circulating eddy currents. An end view of the armature magnetic structure is shown in FIG. 2, from which it is seen that the axially extending magnetic core members 10 extend both through the magnetic bridging member 12 and the pole face member 11.

The armature member further comprises a distributed armature winding 13 disposed on the core members 10. The winding 13 may be of any conventional type and of any desired number of phases and pole pairs. After the armature structure has been assembled as described, the whole is preferably encapsulated in a thermosetting insulation material to fix the several elements and the winding in desired positions and incorporating also a central cylindrical supporting member 14, forming a rigid, unitary, stationary armature structure which may be mounted in any desired manner. Portions of this insulation material are shown at 15, 16, and 17.

The dynamoelectric machine of the invention also comprises a pair of annular magnetic members 18, 18 which, in the case of a hysteresis synchronous motor, are constructed of material having a high hysteretic constant. The annular members 18 are disposed on a pair of supporting discs 19, 19 which, in turn, are mounted on a shaft 20 supported from the member 14 by way of anti-friction bearings 21, 21. The dimensions of the parts are such that the air gaps 22, 22 between the armature structure and the magnetic members 18 are the minimum consistent with mechanical design.

While the hysteresis synchronous motor described above is suitable for embodiment in machines of a wide range of sizes and power ratings, there follow the essential specifications of one successfully operated hysteresis synchronous motor constructed in accordance with the foregoing description.

Armature structure:
  Cores 10—
    7 mil silicon-steel strips 5/8 inch wide tightly wound to outer diameter of 3/16 inch
  Spreader ring 11—
    0.0185 inch silicon steel
    Outer diameter 1.700 inches
    Inner diameter 0.700 inch
    Radial slots 11d 0.031 inch wide
  Bridge ring 12—
    0.0140 inch silicon steel commercially available as "Trancor T" from American Rolling Mills
    Outer diameter 1.700 inches
    Inner diameter 0.700 inch
    Radial slots 12b 0.015 inch wide
  Winding 13—
    125 turns per coil of heavy Formex No. 31 wire
    Coils connected 2 pole, 3 phase, 2/3 pitch, 4 coils per phase in series, Y connected
  Rotor members 18—
    0.094 inch thick ring of 17% steel drawn at 1100° F., surface ground
    Outer diameter 1.700 inches
    Inner diameter 0.700 inch
  Axial air gaps 22—0.004 inch
Performance:
  400 cycles—3.65 watts output at 24.7% efficiency
  60 cycles—
    Maximum power output 5.32 watts at 10.5% efficiency
    Maximum efficiency 13.5% at 2.66 watts output In FIG. 5 is represented a rotor element 23 which may be substituted for each of the rotor elements 18 of FIG. 1 when it is desired to construct an induction motor. The rotor element 23 is formed of magnetic core material and there is formed on one face thereof a series of closed circuit conductors. These may be in the form of radial spokes 23a joined at their inner ends by a ring 23b and at their outer ends by a ring 23c, the elements 23a, 23b, and 23c preferably being embedded in and flush with the face of the rotor 23. A motor comprising the stator structure of FIG. 1 and a pair of rotor elements, as shown in FIG. 5, will operate in a conventional manner as an induction motor.

From the foregoing description it will be seen that a dynamoelectric machine constructed in accordance with the invention has a number of advantages with respect to prior axial air-gap dynamoelectric machines and, in some instances, also with respect to conventional radial air-gap machines:

(1) *Elimination of yoke iron.*—With the double rotor construction described, the entire magnetic structure of the armature is confined to the coil teeth or cores, the usual yoke being replaced by the second rotor. As a result, the amount of armature iron is substantially reduced.

(2) *All core material operates at maximum flux density.*—Substantially all of the core material being confined to the core elements 10, all such material is operated at a uniform high flux density.

(3) *Elimination of punched laminations.*—The magnetic core elements 10 can be readily wound by automatic machinery in an operation much less costly than punching, insulating, and stacking laminations.

(4) *Simple coil assembly.*—The armature coils can be preformed and assembled readily on the open magnetic structure described in lieu of the conventional method of laboriously winding or inserting the coils through narrow slot openings. In addition, better insulation between the coils and the magnetic structure is provided.

(5) *Higher slot space factor.*—The present space factor in conventional motors is of the order of 25%, where this represents the ratio of the area of the copper wire and its insulation to the total area of the slot. In the construction described, the entire winding can be pressed between the spreader rings 11, resulting in a much higher space factor and resulting in a virtually solid lump of working motor.

(6) *Surface grinding.*—The complementary surfaces of the rotors and the armature may be surface ground, an operation involving minimum cost per unit and resulting in maximum uniformity.

(7) *Reduction in rotor waste material.*—The flat annular rotor elements of the hysteresis motor described may be formed by hot-punching steel plate. This results in a much lower scrap content than in the fabrication of the conventional cylindrical hysteresis rotor which must be bored from solid bar stock.

(8) *High air-gap permeance.*—While the two air gaps in the motor described are in series, resulting in a total length of air gap greater than in conventional machines, these gaps are relatively of much larger area and, hence, of higher permeance.

(9) *Increased number of teeth.*—In the construction described, it is possible to provide a relatively large number of teeth without undue construction difficulties. This is in contrast to conventional machines in which it is frequently difficult or impossible to provide the desired number of teeth in a given circumference.

(10) *Magnetic balance.*—The double rotor construction described provides approximate axial magnetic balance, minimizing the requirements of any thrust bearing.

While the invention has been described as applied to hysteresis and induction motors, the principles of construction are also applicable to other types of dynamoelectric machines, such as alternating-current generators, direct-current generators, and direct-current motors.

While there have been described what are at present considered to be the preferred embodiments of the invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A yokeless hysteresis motor of the axial air-gap type comprising: an armature structure including a circular array of axially extending magnetic members, a winding system disposed on said members, a first pair of annular magnetic members engaging opposite ends of said axial magnetic members and serving as pole faces therefor, said annular members being greatly reduced in section between each pair of adjacent ones of said axial magnetic members, and a second pair of axially thin annular magnetic members engaging opposite ends of said axial magnetic members and serving as magnetic bridges therefor; and a third pair of annular electromagnetic members disposed at either end of said array and together completing the magnetic circuits of the members of said array, said third annular members and said armature structure being relatively rotatable.

References Cited in the file of this patent
UNITED STATES PATENTS

| | | |
|---|---|---|
| 4,588 | Page | Oct. 10, 1871 |
| 2,518,756 | Cochran | Aug. 15, 1950 |
| 2,648,807 | Bauer | Aug. 11, 1953 |
| 2,833,945 | Bessiere | May 6, 1958 |
| 2,897,387 | Welter | July 28, 1959 |
| 2,920,574 | Sanpietro | Jan. 12, 1960 |